F. B. PETERSON.
WAFER TONGS.
APPLICATION FILED NOV. 22, 1917.
1,374,522. Patented Apr. 12, 1921.
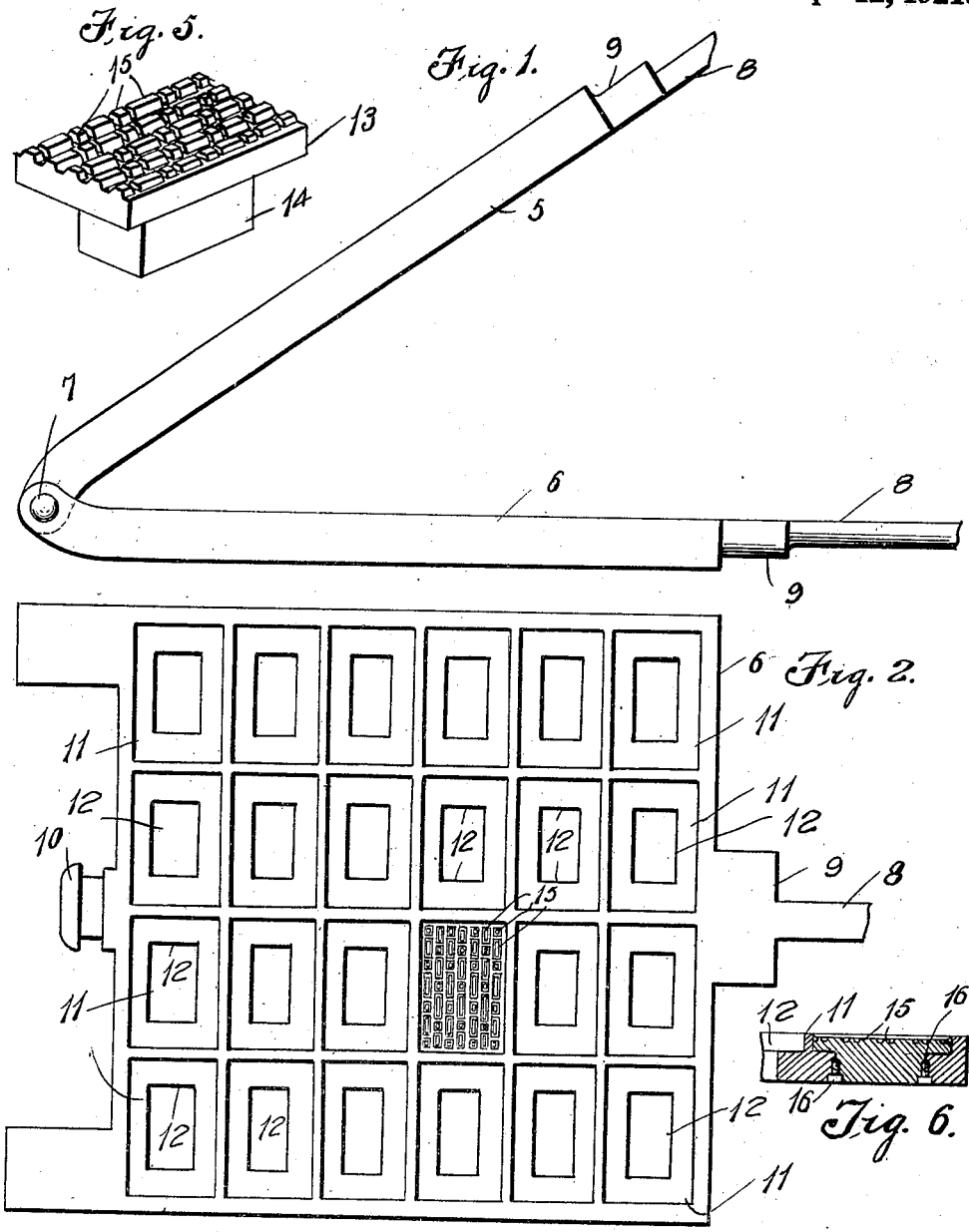

UNITED STATES PATENT OFFICE.

FERDINAND B. PETERSON, OF NEW YORK, N. Y.

WAFER-TONGS.

1,374,522. Specification of Letters Patent. Patented Apr. 12, 1921.

Application filed November 22, 1917. Serial No. 203,431.

*To all whom it may concern:*

Be it known that I, FERDINAND B. PETERSON, a citizen of the United States, residing at New York, in the county of New York and State of New York, have invented certain new and useful Improvements in Wafer-Tongs; and I do hereby declare the following to be a full, clear, and exact description of the invention, such as will enable others skilled in the art to which it appertains to make and use the same.

This invention relates to improvements in wafer tongs.

The object of this invention is to provide a tong consisting of a pair of hinged irons in which are adapted to be removably secured molds for forming edible wafers out of a suitable dough, batter, or the like.

A further object of this invention is to provide a simple and efficient machine for use in the molding and baking of edible wafers where the output is large, and which is simple in operation and requires but a single operator.

A still further object of this invention is to provide a wafer tong of this character, which will be simple, practical and comparatively inexpensive in construction.

With these and other objects in view, the invention consists in the novel combination and arrangement of parts hereinafter more fully described and set forth in the claim hereto appended.

In the drawings

Figure 1 is a side elevation of a wafer tong in partly open position, illustrating the manner in which the irons are hingedly connected together, Fig. 2 is a top plan view of the same partly broken away to illustrate the face of one mold, Fig. 3 is a transverse sectional view of one iron, Fig. 4 is a longitudinal sectional view through one iron, Fig. 5 is a perspective view of one of the molds, Fig. 6 is a sectional view illustrating the manner in which the molds are secured in their respective frames.

Like numerals of reference designate corresponding parts in all the figures of the drawing.

Referring to the drawing, the numerals 5 and 6 designate the irons respectively constituting a frame. The frames 5 and 6 respectively are hingedly connected together as at 7 at one end and the other end is provided centrally with the handles 8. The handles 8 of each frame or iron are provided at their point of juncture with the irons with semi-cylindrical bearing members 9, which form a cylindrical bearing when the frames 5 and 6 are in abutting engagement with one another.

The hinged end of the frame is provided centrally with a headed cylindrical bearing 10 which is in direct alinement with the bearings 9 carried by the handles so that the irons may be journaled in a suitable frame, (not shown) so as to permit the irons to be turned in this frame when placed over a flame so that the contents between the opposing faces of the frames may be evenly baked.

Each frame is provided in its opposing face with elongated rectangular recesses 11 which have their bottom walls provided centrally with rectangular openings 12 which communicate with the recesses 11. It is to be understood that there may be as many recesses and openings as desired, but as shown, there are twenty-four, thus making forty-eight in both frames. The recesses 11 are adapted to receive the molds 13, each mold being provided with a rectangular shank 14 which is adapted to be fitted in the openings 12, thus removably supporting the molds in their respective recesses 11 of each iron.

The rectangular shanks 14 of the molds are each formed integrally with one face thereof and concentrically related thereto so that they may guide the molds 13 in their respective recesses 11 in the irons 5 and 6 respectively. It will be apparent that the molds 13 are of a depth less than the depth of the recesses 11 thus the upper face of the molds 13 will be located below the upper edges of their respective recesses so as to provide a suitable space for receiving the liquid batter or dough, which forms the wafer when the irons are heated. The upper faces of the molds 13 are provided with suitable relatively spaced polygonal projections 15, but may be of any other configuration. Thus it can be seen that when the frames 5 and 6 are moved into engagement with one another that the liquid batter lies between and over the entire surface of the mold faces and a relatively thin edible wafer is baked.

To rigidly hold the molds in their respective recesses and prevent them from dropping out during the opening and closing movement of the frames with relation to each other, there is provided suitable fastening means such as screws or the like and designated 16 which are adapted to be threaded into engagement with the shank 14 of each mold and wall of the recess 11, thus retaining the molds in their respective recesses, as clearly illustrated in Fig. 6 of the drawing.

In connection with the foregoing description, taken in connection with the accompanying drawing, it will be apparent that various molds may be removably fitted in the openings and recesses of the irons, each iron heated on one side, the liquid batter or material placed over the face of one iron or the mold, and the other iron moved into engagement therewith, and the device placed in a suitable frame over a flame until the wafer is baked.

Having thus described my invention what I claim is:

Wafer tongs comprising complemental coextensive mold carrying irons connected at one side edge by spaced hinge members and provided at opposite edges with alined journals of which the common axis is perpendicular to the axis of the hinge members and in a plane midway between the parallel side edges of the irons, one of said journals being of unitary construction and carried by one of the irons and the other being of sectional construction with its complemental members carried respectively by the coöperating irons for registering contacting relation when the irons are closed, said members being longitudinally extended to form complemental handle members.

In testimony whereof I affix my signature in presence of two witnesses.

FERDINAND B. PETERSON.

Witnesses:
BEN A. JEURLING,
ALFRED KARLSON.